(12) United States Patent
Ashton et al.

(10) Patent No.: US 11,254,225 B2
(45) Date of Patent: Feb. 22, 2022

(54) MANAGING VEHICLE INFORMATION

(71) Applicant: XL Hybrids, Boston, MA (US)

(72) Inventors: Justin Ashton, Somerville, MA (US); Neal Ennis Brenner, Needham, MA (US)

(73) Assignee: XL Hybrids, Boston, MA (US)

( * ) Notice: Subject to any disclaimer, the term of this patent is extended or adjusted under 35 U.S.C. 154(b) by 0 days.

(21) Appl. No.: 16/117,024

(22) Filed: Aug. 30, 2018

(65) Prior Publication Data

US 2019/0232800 A1 Aug. 1, 2019

Related U.S. Application Data

(63) Continuation of application No. 15/205,181, filed on Jul. 8, 2016, now Pat. No. 10,086,710, which is a continuation of application No. 13/756,911, filed on Feb. 1, 2013, now Pat. No. 9,390,062.

(60) Provisional application No. 61/593,612, filed on Feb. 1, 2012.

(51) Int. Cl.
*B60L 53/00* (2019.01)
*G07C 5/00* (2006.01)
*B60L 50/10* (2019.01)

(52) U.S. Cl.
CPC ............... *B60L 53/00* (2019.02); *B60L 50/10* (2019.02); *G07C 5/008* (2013.01)

(58) Field of Classification Search
CPC .......... B60L 50/10; B60L 53/00; G07C 5/008
See application file for complete search history.

(56) References Cited

U.S. PATENT DOCUMENTS

| | | | |
|---|---|---|---|
| 1,696,599 | A | 12/1928 | Forsberg |
| 1,790,634 | A | 1/1931 | Arendt |
| 2,132,450 | A | 10/1938 | Wolf |
| 3,493,066 | A | 2/1970 | Dooley |
| 3,732,751 | A | 5/1973 | Berman et al. |
| 3,874,472 | A | 4/1975 | Deane |
| 3,923,115 | A | 12/1975 | Helling |
| 4,042,056 | A | 8/1977 | Horwinski |
| 4,233,858 | A | 11/1980 | Rowlett |
| 4,305,254 | A | 12/1981 | Kawakatsu et al. |
| 4,811,804 | A | 3/1989 | Ewers et al. |
| 5,125,469 | A | 6/1992 | Scott |
| 5,161,638 | A | 11/1992 | Hirano |
| 5,267,623 | A | 12/1993 | Kashiwagi |
| 5,272,939 | A | 12/1993 | Markyvech et al. |
| 5,359,228 | A | 10/1994 | Yoshida |
| 5,441,122 | A | 8/1995 | Yoshida |

(Continued)

OTHER PUBLICATIONS

Abdi, Herve, "Normalizing Data," Encyclopedia of Research Design (2010), 4 pages.

(Continued)

*Primary Examiner* — Rami Khatib
(74) *Attorney, Agent, or Firm* — Fish & Richardson P.C.

(57) ABSTRACT

A system includes a computing device for receiving information representative of activities of an operating first vehicle that includes a propulsion system. The computing device is configured to produce one or more control parameters from the received information in combination with information received from other vehicles, and, provide the one or more control parameters to control operations of a second vehicle.

34 Claims, 6 Drawing Sheets

(56) References Cited

U.S. PATENT DOCUMENTS

| | | | |
|---|---|---|---|
| 5,487,002 A | 1/1996 | Diller et al. | |
| 5,490,063 A | 2/1996 | Genise | |
| 5,558,588 A | 9/1996 | Schmidt | |
| 5,627,752 A | 5/1997 | Buck et al. | |
| 5,778,326 A | 7/1998 | Moroto et al. | |
| 5,856,709 A | 1/1999 | Ibaraki et al. | |
| 5,927,829 A | 7/1999 | Saga et al. | |
| 6,176,808 B1 | 1/2001 | Brown et al. | |
| 6,269,290 B1 | 7/2001 | Egami et al. | |
| 6,314,347 B1 | 11/2001 | Kuroda et al. | |
| 6,328,671 B1 | 12/2001 | Nakajima et al. | |
| 6,356,818 B1 | 3/2002 | Wakashiro et al. | |
| 6,367,570 B1* | 4/2002 | Long, III | B60K 6/485 180/65.26 |
| 6,520,160 B2 | 2/2003 | Kojima et al. | |
| 6,533,692 B1 | 3/2003 | Bowen | |
| 6,630,813 B2 | 10/2003 | Berels et al. | |
| 6,668,954 B2 | 12/2003 | Field | |
| 6,687,581 B2 | 2/2004 | Deguchi et al. | |
| 6,826,460 B2 | 11/2004 | Kittell et al. | |
| 6,868,927 B2* | 3/2005 | Boll | B60H 1/004 180/65.23 |
| 7,013,205 B1 | 3/2006 | Hafner et al. | |
| 7,104,347 B2 | 9/2006 | Severinsky et al. | |
| 7,214,156 B2 | 5/2007 | Oliver | |
| 7,258,183 B2 | 8/2007 | Leonardi et al. | |
| 7,271,555 B1 | 9/2007 | Ciccone | |
| 7,367,415 B2 | 5/2008 | Oliver et al. | |
| 7,395,887 B2 | 7/2008 | Viergever et al. | |
| 7,419,021 B2 | 9/2008 | Morrow et al. | |
| 7,434,640 B2 | 10/2008 | Hughes | |
| 7,434,641 B2 | 10/2008 | Takami et al. | |
| 7,559,578 B2 | 7/2009 | van Leeve et al. | |
| 7,610,124 B2 | 10/2009 | Wakashiro et al. | |
| 7,647,994 B1 | 1/2010 | Belloso | |
| 7,647,997 B2 | 1/2010 | Oliver | |
| 7,665,560 B2 | 2/2010 | Gelinas | |
| 7,674,994 B1 | 3/2010 | Valerio | |
| 7,681,676 B2 | 3/2010 | Kydd | |
| 7,849,944 B2 | 12/2010 | DeVault | |
| 7,921,950 B2 | 4/2011 | Harris | |
| 7,926,387 B2 | 4/2011 | Horiuchi et al. | |
| 7,954,579 B2 | 6/2011 | Rodriguez et al. | |
| 8,215,442 B2 | 7/2012 | Ishii | |
| 8,256,549 B2 | 9/2012 | Crain et al. | |
| 8,337,359 B2 | 12/2012 | Hofbauer | |
| 8,469,137 B2 | 6/2013 | Fujii | |
| 8,596,391 B2 | 12/2013 | Kshatriya | |
| 8,630,784 B2* | 1/2014 | Bai | H04L 1/0002 340/905 |
| 9,818,240 B1 | 11/2017 | Brenner | |
| 9,922,469 B1 | 3/2018 | Ashton et al. | |
| 9,975,542 B1 | 5/2018 | Brenner | |
| 10,083,552 B2 | 9/2018 | Brenner | |
| 10,086,710 B2 | 10/2018 | Ashton et al. | |
| 10,565,805 B2 | 2/2020 | Brenner | |
| 10,744,998 B1 | 8/2020 | Brenner | |
| 10,748,355 B2 | 8/2020 | Ashton et al. | |
| 2003/0010563 A1 | 1/2003 | Osuga et al. | |
| 2005/0205313 A1 | 9/2005 | Gilmore et al. | |
| 2006/0000650 A1 | 1/2006 | Hughey | |
| 2006/0030450 A1 | 2/2006 | Kyle | |
| 2006/0213703 A1 | 9/2006 | Long | |
| 2006/0293841 A1* | 12/2006 | Hrovat | B60T 8/172 701/466 |
| 2007/0027593 A1 | 2/2007 | Shah et al. | |
| 2007/0129878 A1 | 6/2007 | Pepper | |
| 2007/0135988 A1 | 6/2007 | Kidston et al. | |
| 2007/0137919 A1 | 6/2007 | Jolley | |
| 2007/0163819 A1 | 7/2007 | Richter et al. | |
| 2008/0208393 A1* | 8/2008 | Schricker | G08G 1/20 701/1 |
| 2008/0213703 A1 | 9/2008 | Shafer et al. | |
| 2008/0236910 A1 | 10/2008 | Kejha et al. | |
| 2008/0319596 A1 | 12/2008 | Yamada | |
| 2009/0015202 A1 | 1/2009 | Miura | |
| 2009/0192660 A1 | 7/2009 | Tamor et al. | |
| 2009/0198398 A1 | 8/2009 | Yamada | |
| 2009/0212626 A1 | 8/2009 | Snyder et al. | |
| 2009/0223725 A1 | 9/2009 | Rodriguez et al. | |
| 2009/0259355 A1 | 10/2009 | Li | |
| 2010/0001672 A1 | 1/2010 | Maeda et al. | |
| 2010/0044129 A1 | 2/2010 | Kyle | |
| 2010/0106351 A1 | 4/2010 | Hanssen et al. | |
| 2010/0174484 A1* | 7/2010 | Sivasubramaniam | B60L 7/10 701/469 |
| 2010/0219007 A1 | 9/2010 | Dalum et al. | |
| 2010/0274426 A1 | 10/2010 | Le Brusq et al. | |
| 2010/0295803 A1* | 11/2010 | Kim | G01C 21/3661 345/173 |
| 2011/0024211 A1 | 2/2011 | Kikuchi | |
| 2011/0029173 A1 | 2/2011 | Hyde et al. | |
| 2011/0029181 A1 | 2/2011 | Hyde et al. | |
| 2011/0047102 A1 | 2/2011 | Grider et al. | |
| 2011/0071712 A1* | 3/2011 | Mizuno | B60K 6/46 701/22 |
| 2011/0098873 A1 | 4/2011 | Koga et al. | |
| 2011/0148618 A1 | 6/2011 | Harumoto et al. | |
| 2011/0160990 A1 | 6/2011 | Mineta | |
| 2011/0270486 A1 | 11/2011 | Stevens et al. | |
| 2011/0313647 A1* | 12/2011 | Koebler | B60L 50/62 701/123 |
| 2012/0065834 A1* | 3/2012 | Senart | G07C 5/008 701/31.4 |
| 2012/0072049 A1 | 3/2012 | Haaf et al. | |
| 2012/0208672 A1* | 8/2012 | Sujan | B60W 20/20 477/5 |
| 2012/0239462 A1 | 9/2012 | Pursell et al. | |
| 2012/0323474 A1* | 12/2012 | Breed | B60W 30/04 701/117 |
| 2013/0046466 A1 | 2/2013 | Yucel et al. | |
| 2013/0046526 A1 | 2/2013 | Yucel et al. | |
| 2013/0060410 A1 | 3/2013 | Crain et al. | |
| 2013/0179007 A1 | 7/2013 | Dalum | |
| 2015/0081404 A1 | 3/2015 | Basir | |
| 2015/0158483 A1* | 6/2015 | Dalum | B60L 50/16 701/22 |
| 2018/0065485 A1* | 3/2018 | Koebler | B60T 1/10 |
| 2018/0211451 A1 | 7/2018 | Ashton et al. | |
| 2018/0225893 A1 | 8/2018 | Brenner | |
| 2021/0094440 A1 | 4/2021 | Brenner | |
| 2021/0097781 A1 | 4/2021 | Ashton et al. | |

OTHER PUBLICATIONS

What is the Best Car to Convert to Electric? [online] (posted on May 10, 2012), 6 pages. Retrieved from the Internet on Aug. 21, 2015, at: http://www.howtoelectriccar.com/what-is-the-best-car-for-electric-conversion/.

* cited by examiner

# MANAGING VEHICLE INFORMATION

CLAIM OF PRIORITY

This application is a continuation of and claims priority under 35 U.S.C. § 120 to U.S. patent application Ser. No. 15/205,181, filed Jul. 8, 2016, which is a continuation of U.S. patent application Ser. No. 13/756,911, filed Feb. 1, 2013 (now U.S. Pat. No. 9,390,062), which claims priority under 35 USC § 119(e) to U.S. Patent Application Ser. No. 61/593,612, filed Feb. 1, 2012, the entire contents of which are hereby incorporated by reference.

BACKGROUND

This description relates to techniques for managing information being collected from and provided to vehicles.

With the increased interest to reduce dependency on fossil fuels, the use of alternative energy sources has been incorporated into various applications such as transportation. Both public and private transportation vehicles have been developed to run on a fuel other than traditional petroleum based fuels (i.e., petrol, diesel, etc.). Some vehicles solely use alternative energy sources while others combine the functionality of petroleum based systems with alternative energy based systems (e.g., electrical, biofuel, wind, natural gas, etc.). Along with being potentially more cost-effective and having more abundant resources, such alternative energy sources and their byproducts are considered to be more environmentally friendly.

SUMMARY

The systems and techniques described here relate to managing information used for controlling the operation of vehicles such as alternative fuel vehicles, vehicles that use both alternative fuel systems and conventional petroleum based systems, and even vehicles that solely use petroleum based systems. Through collecting, processing and managing such information, vehicle operations may be optimized to provide a variety of advantages including conserving these energy sources, both conventional and alternative.

In one aspect, a computing device-implemented method includes receiving information representative of activities of an operating first vehicle that includes a propulsion system. The method also includes producing one or more control parameters from the received information in combination with information received from other vehicles. The method also includes providing the one or more control parameters for controlling operations of a second vehicle.

Implementations may include any or all of the following features. The first vehicle may include at least a partial alternative fuel propulsion system. The second vehicle may include at least partial alternative fuel propulsion system. The first vehicle may include a combustion engine. The received information may represent aspects of a partial alternative fuel propulsion system. The partial alternative fuel propulsion system may be an electric propulsion system. Producing the one or more control parameters may be executed internal or external to the first vehicle. The one or more control parameters may reflect charging one or more batteries. The second vehicle may be the first vehicle.

In another aspect, a system includes a computing device for receiving information representative of activities of an operating first vehicle that includes a propulsion system. The computing device is configured to produce one or more control parameters from the received information in combination with information received from other vehicles, and, provide the one or more control parameters for controlling operations of a second vehicle.

Implementations may include any or all of the following features. The first vehicle may include at least a partial alternative fuel propulsion system. The second vehicle may include at least partial alternative fuel propulsion system. The first vehicle may include a combustion engine. The received information may represent aspects of a partial alternative fuel propulsion system. The partial alternative fuel propulsion system may be an electric propulsion system. Producing the one or more control parameters may be executed internal or external to the first vehicle. The one or more control parameters may reflect charging one or more batteries. The second vehicle may be the first vehicle.

In another aspect, one or more computer readable media storing instructions that are executable by a processing device, and upon such execution cause the processing device to perform operations that include receiving information representative of activities of an operating first vehicle that includes a propulsion system. The operations also include producing one or more control parameters from the received information in combination with information received from other vehicles. The operations also include providing the one or more control parameters for controlling operations of a second vehicle.

Implementations may include any or all of the following features. The first vehicle may include at least a partial alternative fuel propulsion system. The second vehicle may include at least partial alternative fuel propulsion system. The first vehicle may include a combustion engine. The received information may represent aspects of a partial alternative fuel propulsion system. The partial alternative fuel propulsion system may be an electric propulsion system. Producing the one or more control parameters may be executed internal or external to the first vehicle. The one or more control parameters may reflect charging one or more batteries. The second vehicle may be the first vehicle.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
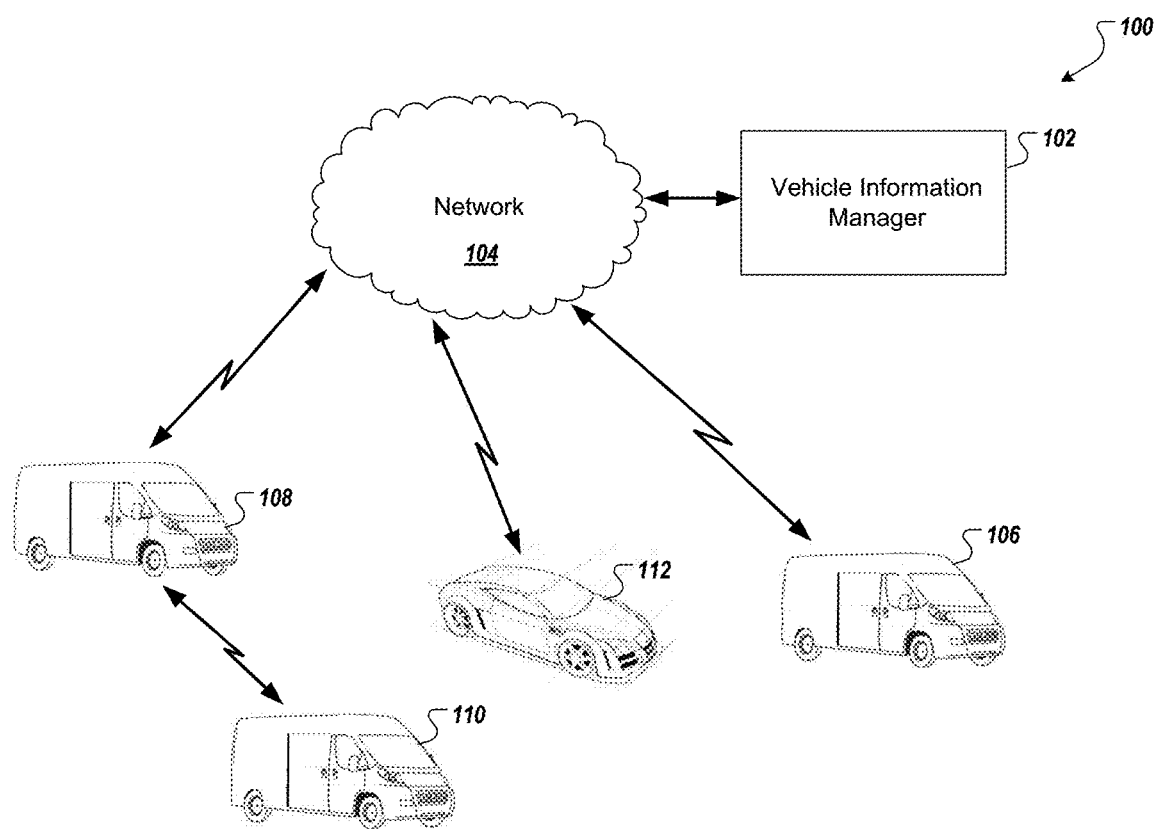
FIG. 1 illustrates the collecting and providing information for controlling operations of various types of vehicles.

Referring to FIG. 1, alternate fuel vehicles may solely rely upon alternative energy sources, such as electricity, natural gas, biofuels etc. Rather than sole reliance on such energy sources, alternative fuel vehicles may also partially rely on an internal combustion engine along with one or more alternative energy sources. For example, a vehicle (referred to as a hybrid vehicle) may use two or more distinct power sources such as electric motor and an internal combustion engine (referred to as a hybrid electric vehicle (HEV)). Some hybrid vehicles (referred to as plug-in hybrid vehicles) may operate by using energy storage devices that can be replenished (e.g., rechargeable batteries). For electrical energy storage devices, in some arrangements, one or more techniques may be implemented for charging and recharging the devices. For example, batteries may be charged through regenerative braking, strategic charging techniques, etc. during appropriate operating periods of the vehicle. In general, while energy is typically lost as heat in conventional braking systems, a regenerative braking system may recover this energy by using an electric generator to assist braking operations. Some systems and techniques may also strategically collect (e.g., leech) energy from the combustion engine during periods of efficient operation and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine and one or more control strategies may be used to determine these time periods. Similarly, periods of time may also be determined to engage regenerative braking and strategic charging to replenish energy storage. Other operations of the vehicle (e.g., accelerate, decelerate, gear changes, etc.) may also be defined for the control strategies. By developing such strategies to control the assistance provided to combustion engines (during low efficiency periods), energy may be conserved without negatively impacting vehicle performance.

Some vehicle manufactures may recommend operations and control strategies for entire classes of vehicles or other types of large vehicle groups (e.g., same model vehicles, same vehicle line, etc.) at particular times (e.g., at the release of the vehicle line). As such these controls are developed for static use and are generally not developed to be dynamically adjusted by the manufacturer or another entity. For example, once the vehicle is purchased, these generic controls are not adjustable.

Illustrated in the figure, an information exchanging environment 100 is presented that allows post sale information to be collected and used to adjust control parameters of alternative energy vehicles such as hybrid vehicles. From the collected, control parameters may be customized and optimized based on post-sale information, for example, such as operator use of vehicles (e.g., feedback information provided from a vehicle, a vehicle operator, etc.). One or more techniques and methodologies may be implemented for collecting such information and correspondingly providing processed information (e.g., control parameters) to the vehicles. For example, one or more communication techniques and network architectures may be used for exchanging information. In the illustrated example a vehicle information manager 102 communicates through a network 104 (e.g., the Internet, an intranet, a combination of networks, etc.) to exchange information with a collection of vehicles (e.g., a small fleet of supply trucks 106, 108, 110, and an automobile 112). In some arrangements the network architecture 104 may be considered as including one or more of the vehicles. For example, vehicles may include equipment for providing one or more network nodes (e.g., supply truck 108 functions as a node for exchanging information between the supply truck 110 and the network 104). As such, the information exchanging capability may include the vehicles exchanging information with the vehicle information manager 102 and other potential network components (e.g., other vehicles, etc.).

One or more technologies may be used for exchanging information among the vehicle information manager 100, the network 104 (or networks) and the collection of vehicles. For example, wireless technology (capable of two-way communication) may be incorporated into the vehicles for exchanging information with the vehicle information manager 102. Along with collecting information from the vehicles, the vehicle information manger 102 may be capable of processing information (e.g., to develop control parameters) and executing related operations (e.g., store collected and processed information). In some arrangements, the vehicle information manager 102 may operate as a single entity; however, operations may be distributed among various entities to provide the functionality. In some arrangements, some functionality (e.g., providing control parameters for hybrid operations) may be considered a service rather than a product that may be attained by entering into a relationship with the vehicle information manager 102 (e.g., purchase a subscription, enter into a contractual agreement, etc.). As such, the vehicle information manager 102 may be considered as being implemented as a cloud computing architecture in which its functionality is perceived by clients (e.g., vehicle operators) as a service rather than a product. For such arrangements, vehicles may be provided information (e.g., control parameters) from one or more shared resources (e.g., hardware, software, etc.) used by the vehicle information manager 102. For service compensation, one or more techniques may be utilized; for example, subscription plans for various time periods may be implemented (e.g., a monthly subscription fee for control parameters to be provided to identified vehicles).

Various types of control parameters and information associated with controlling vehicle operation may be developed and used to improve efficiency. For example, one or more control parameters, control techniques etc. may be associated with vehicle speed (e.g., defining minimum vehicle speed, maximum vehicle speed for system assistance to be initiated). Control parameters may also be defined that are associated with the operation of a regenerative braking system (e.g., the level of regenerative braking of a zero pedal input situation, etc.). One or more predefined operational parameters may also be used for control parameter development (e.g., a target miles-per-gallon (MPG) for initiating system assistance, a target MPG for initiating operations of a regenerative braking system, etc.). Control parameters may also represent quantities associated with the operations of an alternate fuel system such as an electric system (e.g., minimum level to initiate system assistance, maximum level to initiate system assistance, etc.). Parameters (e.g., associated with initiating system assistance) may also be developed based upon vehicle components and component operation (e.g., transmission shift points based upon engine revolutions per minute (rpm), load effects, engine torque output based on position of an accelerator pedal, etc.). Control parameters may also be defined based upon information received from users such as customer or driver feedback (e.g., define one or more control parameters based upon an acceptable minimum acceleration rate while providing a desired level of efficiency, etc.).

Figure 2:
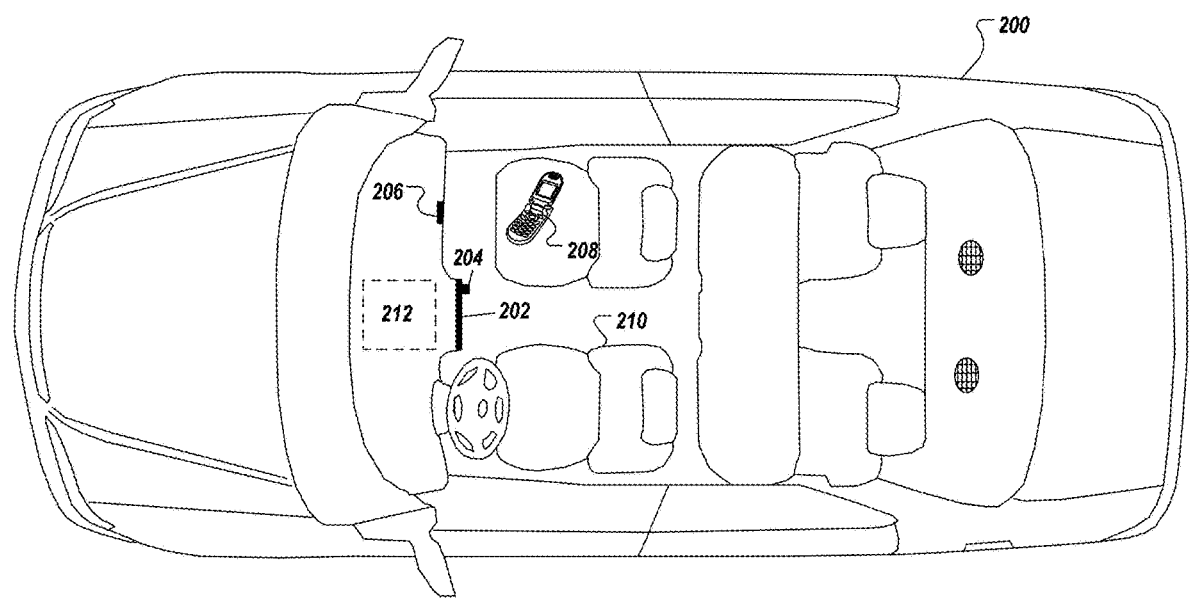
FIG. 2 illustrates components for collecting, processing and providing information to control the operations of a vehicle.

Various types of control scenarios may be provided by the vehicle information manager 102. For example, the vehicle information manager 102 may determine how much to assist a combustion engine based on how efficiently the engine is running at a particular moment. If the engine operating with appropriate efficiency (e.g., a predefined efficiency level), less fuel may be saved from assistance provided by an electric motor. In such a situation, assistance may be reduced as the instantaneous MPG of the gasoline (combustion) engine increases. This MPG target may be set to maintain a charge sustaining system (total regenerative energy needs to be equivalent to the total assistance energy). Based upon changes in temperature and amount of vehicle usage, parameters such as the steady state MPG of the engine may change (e.g., in some situations dramatic changes may be experienced). For example, upon air conditioning being activated and set to a maximum level (e.g., for a hot and humid day), the base MPG of the vehicle typically lowers. If the same target MPG is maintained (e.g., the target MPG with the air conditioning inactive), the amount of assistance provided to the combustion engine could excessive and the alternate fuel system could be inefficiently depleted (e.g., the charge level of one or more batteries of an electric motor system could be diminished). By setting the target MPG based upon a base MPG of the vehicle defined with the air conditioning active, energy provided by the alternate fuel system can be conserved along with fuel. Such a control parameter based upon MPG may be improved from additional information (e.g., temperature, amount of air conditioning use, humidity, acceleration, etc.) provided from one or more sources (e.g., one or more different vehicles) and dynamically changing the target MPG Referring to FIG. 2, a top view of an example vehicle 200 (e.g., a hybrid automobile) illustrates techniques for gathering information for control parameter development and use. Information associated with a vehicle and its operation may be collected from various sources for control parameter development. For example, one or more sensors may be included in the vehicle to collect operation related information (e.g., current operating condition of the vehicle's combustion engine, electric motor, regenerative braking system, etc.). Information may also be gathered, for example, from the operator of the vehicle. In this arrangement, the vehicle 200 includes an electronic display 202 that has been incorporated into its dashboard to present information such as selectable entries regarding different topics (e.g., vehicle operations, trip destination, etc.). Upon selection, representative information may be gathered and provided to the vehicle information manager 102. To interact with the electronic display 202, a knob 204 illustrates a potential control device; however, one or more other types of devices may be used for user interaction (e.g., a touch screen display, etc.). Other types of information may also be gathered; for example, a sensor 206 (here embedded in the dashboard of the vehicle 200) may collect information such as cabin temperature, location of the vehicle (e.g., the sensor being a component of a global positioning system (GPS)) and other types of information. By collecting information such as GPS location information, additional information may be provided for analysis (e.g., location and destination information be used to develop driving profiles that represent acceleration and braking patterns). By collecting data from a fleet of vehicles (e.g., similar or dissimilar to vehicle 200), an analysis can be executed by the vehicle information manager 102 to produce a map of events (e.g., acceleration and braking events) for the area in which the fleet operates (e.g., for defining a control strategy for a new or previously known route). While one sensor 206 is illustrated in this example, multiple sensors may be located internal or external to the vehicle for collecting information (e.g., internal or external temperature). One or more devices present in the vehicle 200 may also be used for information collection; for example, handheld devices (e.g., a smart phone 208, etc.) may collect and provide information (e.g., location information, identify individuals present in the vehicle, etc.) that may be provided for use by the vehicle information manager 102 (e.g., determine current total weight of the vehicle). Similarly, portions of the vehicle itself (e.g., vehicle components) may collect information for the information manager 102; for example, one or more of the seats of the vehicle 200 (e.g., driver seat 210) may collect information (e.g., position of the seat to estimate the driver's weight) include) for being provided to the vehicle information manager 102.

To act upon the information collected and to provide an interface with the vehicle information manager 102 (shown in FIG. 1), the vehicle 200 may include a control manager 212. In some arrangements that control manager 212 is implemented as software (e.g., executable instructions) in a computing device contained in the vehicle; however, hardware or a combination of software and hardware may be incorporated into the vehicle 200 to provide the functionality of the control manager 212. In the illustrated example, the control manager 212 provides the functionality of gathering collected information and providing it to the vehicle information manager 102. As mentioned above, various types of information may be gathered; operational information (e.g., current speed, acceleration, travel direction, location, etc.), information unique to the vehicle (e.g., vehicle identification number, user/owner identification information) along with other types of information (e.g., contractual information such as subscription identification information, etc.) may be provided by the control manager 212. One or more types of communication techniques and methodologies may be implemented by the control manager 212 (e.g., to exchange data with the vehicle information manager 102). For example, one or more wireless communication techniques (e.g., radio frequency, infrared, etc.) that may utilize one or more protocols and/or standards (e.g., the IEEE 802.11 family of standards such as Wi-Fi, the International Mobile Telecommunications-2000 (IMT-2000) specifications such as $3^{rd}$ generation mobile telecommunications (3G), $4^{th}$ generation cellular wireless standards (4G), wireless technology standards for exchanging data over relatively short distances such as Bluetooth, etc.). Along with communicating with the vehicle information manager 102, the control manager 212 may also function as an interface with components of the vehicle 200. For example, one or more control parameters (e.g., received from the vehicle information manager 102) may be provided to appropriate components of the vehicle (e.g., interface modules, circuitry, etc. for controlling the operations of a combustion engine, an electrical motor, etc.). Functionality of the vehicle information manager 102 and the control manager 212 may be distributed in a number of manners. For example, in one arrangement the control manager 212 may provide information to the vehicle information manager 102 for determining control parameters, which may be provided to back to the control manager 212 for delivery to appropriate components of the vehicle 200. Rather than being received by the control manager 212, control parameters may be delivered to one or more other components of the vehicle 200. In some arrangements, a portion of the vehicle information manager's 102 functionality may be executed onboard the vehicle 200 by the control manager 212. As such, the control manager 212 may operate significantly autonomous, although the functionality of the vehicle information manager 102 and the control manager 212 may be distributed in different manners in some arrangements. Additionally, information may be provided to the control manager 212 from sources external to the vehicle 200. For example, for autonomous operation, information (e.g., weather, traffic, road conditions, etc.) collected from other vehicles, sensors and/or other types of information sources (e.g., web assets such as websites) may be provided to the control manager 212.

Figure 3:
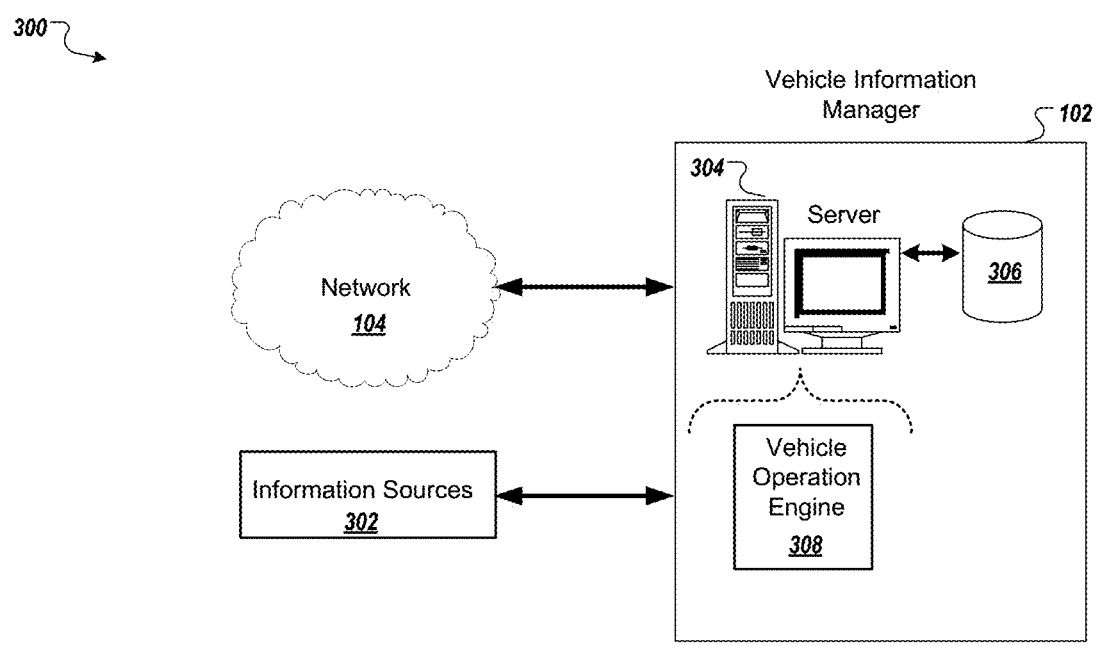
FIG. 3 illustrates a vehicle information manager.

Referring to FIG. 3, a graphical representation illustrates an environment 300 for processing information to develop parameters for assisting the operation of alternative fuel vehicles and other potential operations. In general, control strategies may be optimized (e.g., for an individual vehicle, a fleet of similar vehicles) based on actual vehicle use information and by developing forecast data (e.g., control parameters) that could improve vehicle efficiency, for example, by identifying fuel-saving opportunities for alternative fuel vehicles (e.g., hybrid vehicles).

Along with information being provided by one or more vehicles (e.g., received through the network 104 or through the user of other data exchanging techniques), the vehicle information manager 102 may utilize data from other sources. For example, information sources 302 external to the vehicle information manager 102 may provide vehicle related information (e.g., manufacture recommendations for vehicle operation, etc.), environmental information (e.g., current road conditions where the vehicle is operating, traffic conditions, topographical information, weather conditions and forecasts, etc.). The information sources 302 may include government sources (e.g., municipal, state, etc.) that provide transportation information (e.g., travel restrictions for particular vehicles, route detours, gas prices and locations, etc.), commercial sources (e.g., trucking companies, etc.) that also provide transportation information (e.g., vehicle destinations, vehicle load pick-up and drop-off points, updated or changes in routing information to reroute vehicles from normal routes, e.g., based upon a delivery schedule change), etc. In some arrangements, the information sources 302 may be in direct communication with the vehicle information manager 102; however, other communication techniques may also be implemented (e.g., information from the information sources 302 may be provided through one or more networks such as network 104).

One or more techniques may be implemented by the vehicle information manager 102 to develop (e.g., produce, update, etc.) vehicle control strategies from the data collected from the vehicles and the information sources 302. Such developments utilize information from one or more vehicles that represents operational data (e.g., vehicle speed, driver's intended acceleration/deceleration, gearing, and engine speed, fuel flow rate, etc.). Sensor information (e.g., from embedded vehicle sensors, sensing device present in the vehicle, etc.) may also provide information such as vehicle weight, road grade, temperature, etc. that is used to analyze the vehicle's activity and develop a profile representative of the manner in which the vehicle is driven. Vehicles such as delivery vans may frequently be driven in similar manners (e.g., similar driving pattern, operating hours, routes, mileage, cargo being hauled, mannerisms of the drivers, etc.). From relative current information (e.g., data provided near real time) and previously collected information (e.g., historical data for a vehicle, a fleet of similar vehicles, etc.), the vehicle information manager 102 may analyze and produce a control strategy that accounts for the provided information. For example, a strategy may be produced for an individual vehicle that accounts for data associated with vehicle and information that accounts for historical patterns of similar vehicles, vehicles operating under similar conditions, etc. Since a fleet of similar vehicles would typically produce larger amounts of information, compared to information generated by a single vehicle, control strategies based upon multiple vehicles (e.g., vehicles operating under similar environmental conditions, vehicles operating in the same general geographical area, the entire vehicle fleet, etc.) may provide more efficient strategies for controlling a vehicle of a similar type.

Along with developing control parameters for operations of one or more vehicles, control parameters may also address other activities related to vehicle operation. For example, some alternative fuel vehicles such as plug-in hybrid electric vehicles (PHEV) allow their batteries to be charged by regenerative braking but also allow the batteries to be recharged from an electric energy source (e.g., the batteries are plugged into the electric grid to be charged or recharged). Information reflective of charging such batteries may be incorporated into the analysis provided by the vehicle information manager 102 to determine appropriate control strategies for vehicles. For example, by analyzing the location of potential charging stations, historical availability of the charging stations, current and projected electricity cost, electricity load/demand information, information associated with the electricity grid and/or utility providers (e.g., economic and historical data), etc. may be used for developing appropriate vehicle control strategies.

In the illustrated example, to provide such functionality, the vehicle information manager 102 includes a server 304 that is capable of being provided information from the network 104 and the information sources 302. Additionally, the server 304 is illustrated as being in direct communication with a storage device 306 that is located at the vehicle information manager 102. To provide the functionality of managing vehicle information, a vehicle operation engine 308 is executed by the server 304. Provided information from one or more of the sources, control parameters may be developed by the vehicle operation engine 308. Along with determining one or more control parameters to improve efficiency while retaining vehicle performance, functionality of the vehicle operation engine 308 may appropriately manage the distribution of the determined control parameters for delivery to one or more vehicles. For example, one or more database systems or other types of data management architectures may be utilized by the vehicle operation engine 308 to information distribution. In some arrangements, such distribution functionality may be provided partially or fully by the engine or external to the engine. In some arrangements this distribution functionality may be provided by other portions of the vehicle information manager 102 or provided by another entity separate from the information manager for distributing control parameter and/or other types of information. Further, while a single server (e.g., server 304) is implemented in this arrangement to provide the functionality for the vehicle information manager 102, additional servers or other types of computing devices may be used to provide the functionality. For example, operations of the vehicle operation engine 308 may be distributed among multiple computing devices located at one or more locations.

Upon one or more control strategies being produced, one or more operations may be executed to provide appropriate information to one or more vehicles. For example, operations of a computing device (e.g., the server 304) located at the vehicle information manager 102 may provide the information to the appropriate vehicle (or vehicles). By using one or more wireless links the information may be delivered (e.g., through the network 104). In some arrangements one or more trigger events may initiate the information being sent to a vehicle. For example, upon one or more messages, signals, etc. being received at the vehicle information manager 102 (e.g., that identify a desired destination and a starting location of a hybrid vehicle), data representing the appropriate control strategy (e.g., for operating a hybrid, plug-in hybrid vehicle or conventional vehicle, etc.) may be provided to the vehicle. For arrangements in which the analysis is executed onboard the vehicle, parameters for control strategies may be identified onboard (e.g., by the control manager 212) and provided to appropriate components of the vehicle. In still other arrangements, one or more strategies could be manually loaded onto a vehicle—for example a vehicle could be preloaded with a strategy specific to typical routes (e.g., previously defined), have multiple driver-selectable strategies loaded, etc. Along with providing strategies, updated data may similarly be sent to vehicles to make needed adjustments to previously provided strategies (e.g., update control parameter values). Adjustments to provided strategies may also be adjusted after delivery to the vehicle. For example, one or more components included in the vehicles may monitor the strategies (e.g., using artificial intelligence algorithms, neural networks, etc.) and make appropriate adjustments (e.g., optimize control parameter values) for a combustion engine, an electric motor, etc. of the vehicle.

Figure 4:
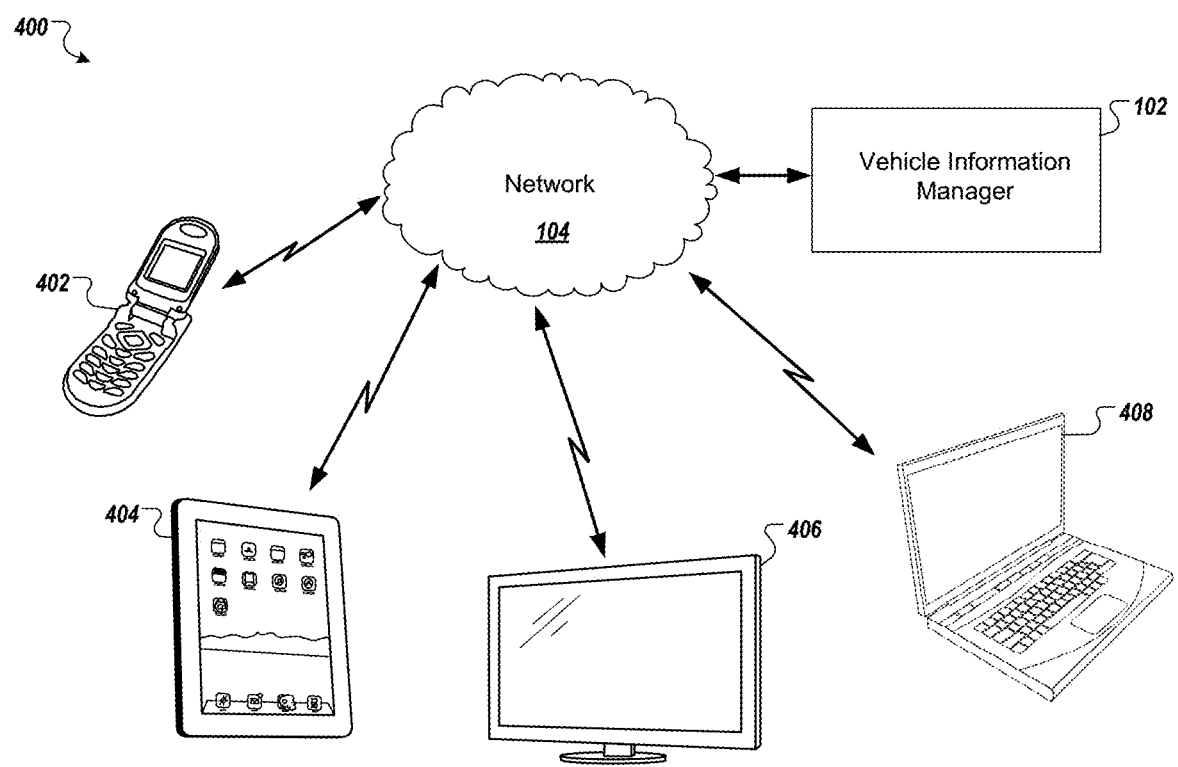
FIG. 4 illustrates devices for presenting vehicle information.

Referring to FIG. 4, along with providing information reflective of control strategies to vehicles, information may be provided to other systems and devices (e.g., for further processing and analysis operations). Illustrated in the figure, a collection 400 of potential platforms, devices, etc. is shown that represents other systems that may be provided information from the vehicle information manager 102. For example, through one or more wireless communication links (e.g., via the network 104), information may be provided to hand-held devices such as a cellular telephone 406, a tablet computing device 404, a smart device, etc. to provide the control strategies determined for one or more vehicles. Similarly, a display device (e.g., a television 406) or different types of computing devices (e.g., a laptop computer system 408) may be provided the information for presentation to a user (and for potentially collecting feedback). Along with being allowed to review the information (e.g., presented in a web asset such as a website, web page, etc.), further analysis may be executed. For example, the information may be used to identify particular vehicles, fleets of vehicles, and other types of candidate vehicles capable of having their performance improved. For one potential program, vehicles may be identified for fuel efficiency improvements such as being retrofitted to become hybrid vehicles. As such, users of such devices (e.g., potential vehicle purchasers, fleet vehicle purchasers, etc.) may be provided useful information (e.g., when selecting vehicles, developing business plans, etc.).

Figure 5:
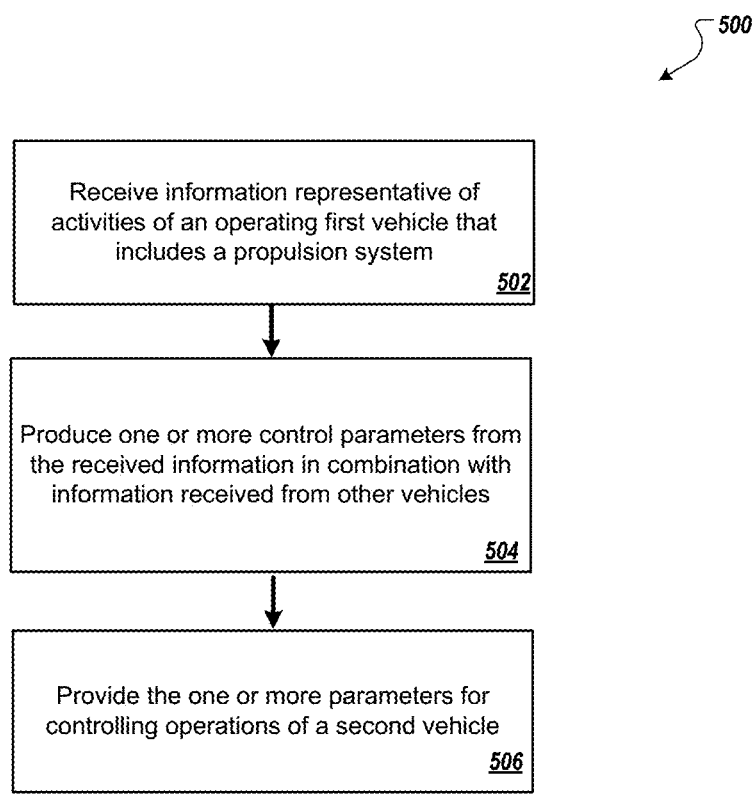
FIG. 5 is a representative flow chart of operations for managing information for controlling vehicle operations.

Referring to FIG. 5, a flowchart 500 represents operations of a computing device such as the server 304 (shown in FIG. 3) for managing vehicle information (e.g., for identifying appropriate control parameters and parameter values to improve operations of an alternative fuel vehicle, a conventional vehicle, etc.). Such operations, e.g., of the vehicle operation engine 308 (also shown in FIG. 3), are typically executed by components (e.g., processors, etc.) included in a single computing device (e.g., the server 304 of FIG. 3); however, operations may be executed by multiple computing devices. Along with being executed at a single site (e.g., at the vehicle information manager 102, onboard a vehicle, etc.), operation execution may be distributed among two or more locations.

Operations may include receiving 502 information (e.g., data) representative of activities of an operating vehicle that includes a propulsion system. For example, location information of the vehicle (e.g., a vehicle with at least a partial alternative fuel propulsion system) along with other types of information (e.g., instances of braking, accelerating the vehicle, etc.) may be provided. Operations may also include producing 504 one or more control parameters from the received information in combination with information received from other vehicles. For example, based upon the collected information, strategies may be developed for engaging an electric motor included in the vehicle, executing regenerative braking operations to recharge a battery included in the vehicle, etc. Operations may also include providing 506 the one or more parameters for controlling operations of a vehicle, which may or may not be the vehicle from which the activity information was received. For example, the control parameters may be provided to a vehicle that is operating under similar circumstances as the vehicle that provided the activity information. Alternatively, the control parameters may be produced onboard the same vehicle that provided the activity information.

Figure 6:
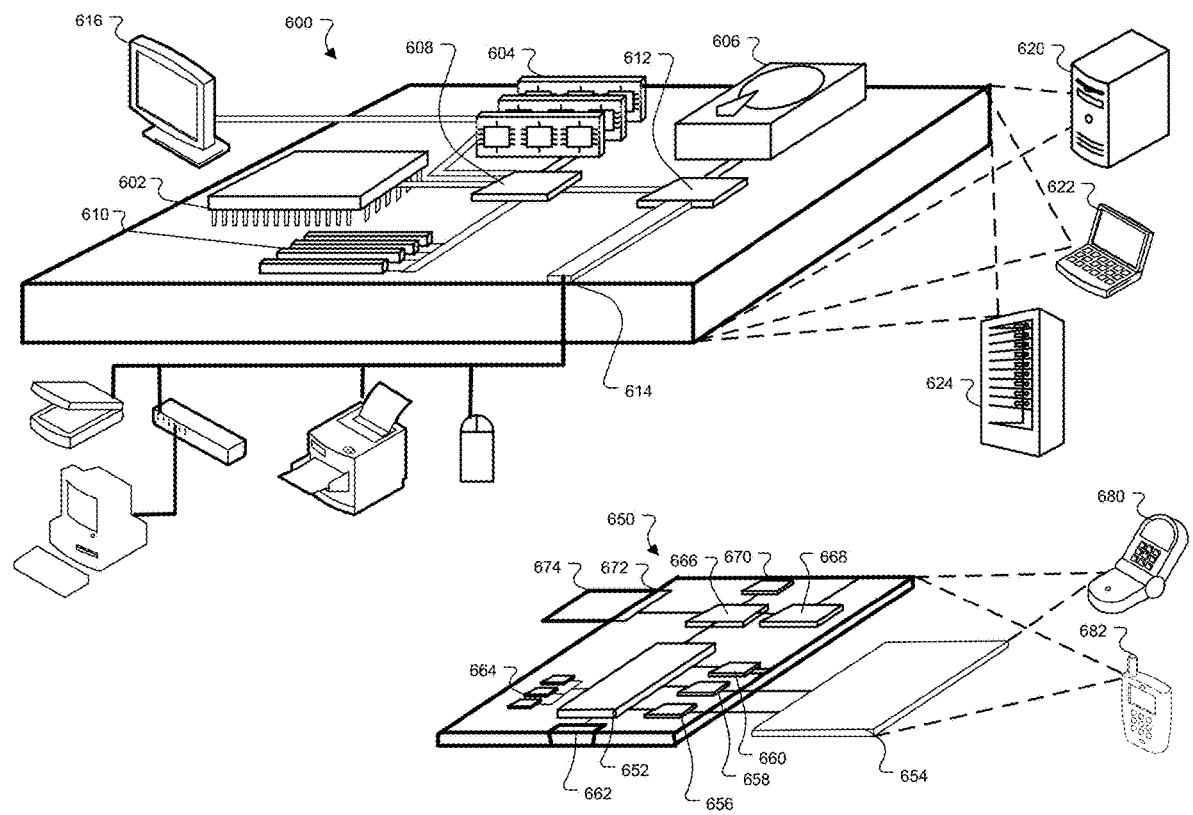
FIG. 6 is a block diagram of computing devices and systems.

FIG. 6 shows an example of example computer device 600 and example mobile computer device 650, which can be used to implement the techniques described herein. For example, a portion or all of the operations of the vehicle operation engine 308 may be executed by the computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low speed interface 612 connecting to low speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606 to display graphical data for a GUI on an external input/output device, including, e.g., display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

Memory 604 stores data within computing device 600. In one implementation, memory 604 is a volatile memory unit or units. In another implementation, memory 604 is a non-volatile memory unit or units. Memory 604 also can be another form of computer-readable medium, including, e.g., a magnetic or optical disk.

Storage device 606 is capable of providing mass storage for computing device 600. In one implementation, storage device 606 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 604, storage device 606, memory on processor 602, and the like.

High-speed controller 608 manages bandwidth-intensive operations for computing device 600, while low speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer including, e.g., laptop computer 622. In some examples, components from computing device 600 can be combined with other components in a mobile device (not shown), including, e.g., device 650. Each of such devices can contain one or more of computing device 600, 650, and an entire system can be made up of multiple computing devices 600, 650 communicating with each other.

Computing device 650 includes processor 652, memory 664, an input/output device including, e.g., display 654, communication interface 666, and transceiver 668, among other components. Device 650 also can be provided with a storage device, including, e.g., a microdrive or other device, to provide additional storage. Each of components 650, 652, 664, 654, 666, and 668, are interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for coordination of the other components of device 650, including, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations, and multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 650 through expansion interface 672, which can include, for example, a SIMM (Single In Line Memory Module) card interface. Such expansion memory 674 can provide extra storage space for device 650, or also can store applications or other data for device 650. Specifically, expansion memory 674 can include instructions to carry out or supplement the processes described above, and can include secure data also. Thus, for example, expansion memory 674 can be provided as a security module for device 650, and can be programmed with instructions that permit secure use of device 650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 664, expansion memory 674, and/or memory on processor 652, which can be received, for example, over transceiver 668 or external interface 662.

Device 650 can communicate wirelessly through communication interface 666, which can include digital signal processing circuitry where necessary. Communication interface 666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, including, e.g., using a Bluetooth®, WiFi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken data from a user and convert it to usable digital data. Audio codec 660 can likewise generate audible sound for a user, including, e.g., through a speaker, e.g., in a handset of device 650. Such sound can include sound from voice telephone calls, can include recorded sound (e.g., voice messages, music files, and the like) and also can include sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

Processes described herein and variations thereof (referred to as "the processes") include functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
   receiving information representative of activities of a first vehicle that includes a propulsion system;
   producing one or more control parameters from the received information in combination with information received from other vehicles, the one or more control parameters including a target efficiency threshold; and
   providing the one or more control parameters for controlling operations of a controller of the first vehicle or a second vehicle, wherein the first or second vehicle being provided the one or more control parameters includes a hybrid electric propulsion system, the provided one or more control parameters causing the controller to control a level of assistance that an electric motor of the hybrid electric propulsion system provides to a combustion engine of the hybrid electric propulsion system,
   wherein the provided one or more control parameters cause the controller to control the level of assistance based on an efficiency level of the combustion engine, the target efficiency threshold, and an available electric energy, wherein the efficiency level of the combustion engine represents a distance per volume of fuel consumed by the combustion engine.

2. The computing device-implemented method of claim 1, wherein the received information represents aspects of a hybrid electric propulsion system.

3. The computing device-implemented method of claim 1, wherein producing the one or more control parameters is executed external to the first or second vehicle being provided the one or more control parameters.

4. The computing device-implemented method of claim 1, wherein at least one of the one or more control parameters relate to charging one or more batteries to produce the available electric energy.

5. The computing device-implemented method of claim 1, wherein the information representative of activities of the first vehicle is received substantially in real time.

6. The computing device-implemented method of claim 1, wherein the information received from the other vehicles has been previously collected.

7. The computing device-implemented method of claim 6, wherein the information received from the other vehicles is received from a computer readable storage device.

8. The computing device-implemented method of claim 1, wherein the level of assistance comprises charging one or more batteries of the first or second vehicle being provided the one or more control parameters to produce the available electric energy.

9. The computing device-implemented method of claim 1, wherein at least one of the one or more control parameters relate to an operation of the electric motor of the hybrid electric propulsion system.

10. The computing device-implemented method of claim 1, wherein the available electric energy is retrievable from a battery of the first or second vehicle being provided the one or more control parameters, wherein the battery is chargeable by an electric energy source external to the first or second vehicle being provided the one or more control parameters.

11. The computing device-implemented method of claim 1, wherein the target efficiency threshold represents a target fuel consumption ratio representing a target distance per volume of fuel consumed.

12. The computing device-implemented method of claim 11, wherein the target efficiency threshold represents a target miles-per-gallon threshold.

13. The computing device-implemented method of claim 1, wherein the level of assistance is further based on one or more environmental parameters.

14. The computing device-implemented method of claim 13, wherein the one or more environmental parameters are associated with an environmental temperature of the first or second vehicle being provided the one or more control parameters.

15. The computing device-implemented method of claim 13, wherein the one or more environmental parameters are associated with a cooling system of the first or second vehicle being provided the one or more control parameters.

16. The computing device-implemented method of claim 1, wherein the efficiency level of the combustion engine represents an instantaneous miles-per-gallon rating of the combustion engine.

17. A system comprising:
a computing device for receiving information representative of activities of a first vehicle that includes a propulsion system; and
wherein the computing device is configured to
produce one or more control parameters from the received information in combination with information received from other vehicles, the one or more control parameters including a target efficiency threshold; and
provide the one or more control parameters for controlling operations of a controller of the first vehicle or a second vehicle, wherein the first or second vehicle being provided the one or more control parameters includes a hybrid electric propulsion system, the provided one or more control parameters causing the controller to control a level of assistance that an electric motor of the hybrid electric propulsion system provides to a combustion engine of the hybrid electric propulsion system,
wherein the provided one or more control parameters cause the controller to control the level of assistance based on an efficiency level of the combustion engine, the target efficiency threshold, and an available electric energy, wherein the efficiency level of the combustion engine represents a distance per volume of fuel consumed by the combustion engine.

18. The system of claim 17, wherein the received information represents aspects of the hybrid electric propulsion system.

19. The system of claim 17, wherein producing the one or more control parameters is executed external to the first or second vehicle being provided the one or more control parameters.

20. The system of claim 17, wherein at least one of the one or more control parameters relate to charging one or more batteries to produce the available electric energy.

21. The system of claim 17, wherein the information representative of activities of the first vehicle is received substantially in real time.

22. The system of claim 17, wherein the information received from the other vehicles has been previously collected.

23. The system of claim 22, wherein the information received from the other vehicles is received from a computer readable storage device.

24. The system of claim 17, wherein the level of assistance comprises charging one or more batteries of the first or second vehicle being provided the one or more control parameters to produce the available electric energy.

25. The system of claim 17, wherein at least one of the one or more control parameters relate to an operation of the electric motor of the hybrid electric propulsion system.

26. One or more non-transitory computer readable media storing instructions that are executable by a processing device, and upon such execution cause the processing device to perform operations comprising:
receiving information representative of activities of a first vehicle that includes a propulsion system;
producing one or more control parameters from the received information in combination with information received from other vehicles, the one or more control parameters including a target efficiency threshold; and
providing the one or more control parameters for controlling operations of a controller of the first vehicle or a second vehicle, wherein the first or second vehicle being provided the one or more control parameters includes a hybrid electric propulsion system, the provided one or more control parameters causing the controller to control a level of assistance that an electric motor of the hybrid electric propulsion system provides to a combustion engine of the hybrid electric propulsion system,
wherein the provided one or more control parameters cause the controller to control the level of assistance based on an efficiency level of the combustion engine, the target efficiency threshold, and an available electric energy, wherein the efficiency level of the combustion engine represents a distance per volume of fuel consumed by the combustion engine.

27. The non-transitory computer readable media of claim 26, wherein the received information represents aspects of the hybrid electric propulsion system.

28. The non-transitory computer readable media of claim 26, wherein producing the one or more control parameters is executed external to the first or second vehicle being provided the one or more control parameters.

29. The non-transitory computer readable media of claim 26, wherein at least one of the one or more control parameters relate to charging one or more batteries to produce the available electric energy.

30. The non-transitory computer readable media of claim 26, wherein the information representative of activities of the first vehicle is received substantially in real time.

31. The non-transitory computer readable media of claim 26, wherein the information received from the other vehicles has been previously collected.

32. The non-transitory computer readable media of claim 31, wherein the information received from the other vehicles is received from a computer readable storage device.

33. The non-transitory computer readable media of claim 26, wherein the level of assistance comprises charging one or more batteries of the first or second vehicle being provided the one or more control parameters to produce the available electric energy.

34. The non-transitory computer readable media of claim 26, wherein at least one of the one or more control parameters relate to an operation of the electric motor of the hybrid electric propulsion system.

* * * * *